United States Patent
Jin et al.

(10) Patent No.: US 10,448,315 B2
(45) Date of Patent: Oct. 15, 2019

(54) METHOD FOR INDICATING PHYSICAL CELL IDENTIFIER AND APPARATUS

(71) Applicant: Huawei Technologies Co., Ltd., Shenzhen (CN)

(72) Inventors: Zhe Jin, Beijing (CN); Guangwei Yu, Beijing (CN); Zhihu Luo, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 16 days.

(21) Appl. No.: 15/719,700

(22) Filed: Sep. 29, 2017

(65) Prior Publication Data
US 2018/0027482 A1    Jan. 25, 2018

Related U.S. Application Data

(63) Continuation of application No. PCT/CN2015/075453, filed on Mar. 31, 2015.

(51) Int. Cl.
| H04W 48/10 | (2009.01) |
| H04W 48/08 | (2009.01) |
| H04W 36/00 | (2009.01) |
| H04W 48/16 | (2009.01) |
| H04W 48/12 | (2009.01) |

(52) U.S. Cl.
CPC ....... *H04W 48/10* (2013.01); *H04W 36/0061* (2013.01); *H04W 48/08* (2013.01); *H04W 48/16* (2013.01); *H04W 48/12* (2013.01)

(58) Field of Classification Search
CPC . H04W 48/10; H04W 48/16; H04W 36/0061; H04W 48/08; H04W 48/12
See application file for complete search history.

(56) References Cited

U.S. PATENT DOCUMENTS

2009/0323957 A1* 12/2009 Luo ................... H04J 11/0069
                                                        380/270
2010/0278142 A1   11/2010 Dwyer et al.
(Continued)

FOREIGN PATENT DOCUMENTS

| CN | 101778395 A | 7/2010 |
| CN | 101784070 A | 7/2010 |

(Continued)

OTHER PUBLICATIONS

"3rd Generation Partnership Project; Technical Specification Group GSM/EDGE Radio Access Network; Cellular System Support for Ultra Low Complexity and Low Throughput Internet of Things; (Release 13)," 3GPP TR 45.820 V1.0.1, Mar. 2015, 148 pages.

(Continued)

*Primary Examiner* — Feben Haile
(74) *Attorney, Agent, or Firm* — Slater Matsil, LLP

(57) ABSTRACT

Embodiments of the present invention provide a method for indicating a physical cell identifier and an apparatus, and relate to the field of communications technologies. The method includes determining, by the terminal device according to a first broadcast message sent by the base station, a PCI of a target cell in which the terminal device is located and determining a first scrambling code according to the PCI of the target cell. The method also includes determining an extended PCI of the target cell according to a second broadcast message sent by the base station and the first scrambling code.

18 Claims, 4 Drawing Sheets

(56) References Cited

U.S. PATENT DOCUMENTS

2012/0093021 A1* 4/2012 Kim .................. H04J 13/0062
370/252
2016/0227527 A1* 8/2016 Fujishiro ............... H04W 16/32

FOREIGN PATENT DOCUMENTS

| CN | 101932075 A | 12/2010 |
| CN | 102067645 A | 5/2011 |
| CN | 102415162 A | 4/2012 |
| EP | 2882255 A1 | 6/2015 |
| WO | 2014021083 A1 | 2/2014 |

OTHER PUBLICATIONS

"Discussion on Network Assistance Signaling for Small Cell Discovery," Agenda Item: 7.2.1.2.3, Source: Huawei, HiSilicon, Document for: Discussion/Decision, 3GPP TSG RAN WG1 Meeting #78, R1-142828, Aug. 18-22, 2014, 6 pages.

* cited by examiner

METHOD FOR INDICATING PHYSICAL CELL IDENTIFIER AND APPARATUS

CROSS-REFERENCE TO RELATED APPLICATIONS

This application is a continuation of International Application No. PCT/CN2015/075453, filed on Mar. 31, 2015, the disclosure of which is hereby incorporated by reference in its entirety.

TECHNICAL FIELD

The present invention relates to the field of communications technologies, and in particular, to a method for indicating a physical cell identifier (PCI for short) and an apparatus.

BACKGROUND

When growing requirements are imposed on "Internet of everything," technologies related to Internet of Things are developing more rapidly. As an Internet of Things system, an NB M2M (Narrow Band Machine-To-Machine) system has an architecture similar to an existing cellular network. In this architecture, a terminal device performs data transmission according to scheduling by a base station.

In a common NB M2M system scenario, a base station may have multiple cells to cover terminal devices at different locations. When communicating with the base station, a terminal device needs to first obtain some information about a cell in which the terminal device is located. A physical cell identifier (PCI) is a type of relatively important cell information.

Existing NB M2M systems are designed by mainly referring to a Long Term Evolution (LTE) system. A PCI of each cell in the LTE system is indicated by using a PSS (Primary Synchronization Signal) sequence and an SSS (Secondary Synchronization Signal) sequence. Specifically, a base station has three cells. The three cells are identified by using three different PSS sequences; and different base stations in the LTE system are identified by using 168 SSS sequences. As a result, the cells in the LTE network are identified by using 504 different PCIs. When receiving broadcast information sent by the base station, a terminal device performs time-frequency synchronization on the broadcast information and the 3 PSS sequences and the 168 SSS sequences stored in the terminal device, to obtain a PCI of a cell in which the terminal device is located.

In an NB M2M system, if a PCI design method same as that of the LTE system is used, a terminal device of the NB M2M system usually consumes more power when obtaining the PCI. This is contrary to an original low-cost and low-power-consumption design of the terminal device of the NB M2M system. One feasible design method is to set a smaller quantity of PCIs for a cell in the NB M2M system (that is, to set a smaller quantity of SSS sequences that are used to identify a base station in the NB M2M system), so that the quantity of SSS sequences stored in the terminal device is reduced. This simplifies a time-frequency synchronization process performed by the terminal device, so as to reduce cost and power consumption of the terminal device.

However, when a smaller quantity of PCIs for the cell in the NB M2M system is set, a probability that cells with a same PCI occur within a specific area is higher than that in a case with a larger quantity of PCIs. When the terminal device simultaneously receives data sent by the base station to the cells with a same PCI, the terminal device is unable to normally obtain information from the received data.

SUMMARY

Embodiments of the present invention provide a method for indicating a physical cell identifier and an apparatus, so as to resolve a problem that a terminal device is unable to normally obtain information from received data when the terminal device simultaneously receives the data sent by a base station to cells with a same physical cell identifier (PCI).

To achieve the foregoing objective, the following technical solutions are used in the embodiments of the present invention.

According to a first aspect, a method for indicating a physical cell identifier PCI is provided, and the method is applied to a communications system. The method includes determining, by a terminal device according to a first broadcast message sent by a base station, a PCI of a target cell in which the terminal device is located and determining a first scrambling code according to the PCI of the target cell. The method also includes determining an extended PCI of the target cell according to a second broadcast message sent by the base station and the first scrambling code, where the extended PCI identifies the target cell, or a combination of the extended PCI and the PCI of the target cell identifies the target cell.

With reference to the first aspect, in a first possible implementation, after the determining an extended PCI of the target cell, the method further includes: determining, by the terminal device, a second scrambling code according to the extended PCI when the extended PCI identifies the target cell, where the second scrambling code is used to enable the terminal device to decode data received from the base station; or determining, by the terminal device, a second scrambling code according to the combination of the extended PCI and the PCI of the target cell when the combination of the extended PCI and the PCI of the target cell identifies the target cell, where the second scrambling code is used to enable the terminal device to decode data received from the base station.

With reference to the first aspect or the first possible implementation of the first aspect, in a second possible implementation, the extended PCI is a cell identity of a global cell identity; or the extended PCI is a combination of a cell identity of a global cell identity and all bits or some bits of a location area identity of the global cell identity.

With reference to any one of the first aspect to the second possible implementation of the first aspect, in a third possible implementation, the first broadcast message includes a primary synchronization signal (PSS) sequence and a secondary synchronization signal (SSS) sequence that are used to indicate the PCI of the target cell; and the determining, by a terminal device according to a first broadcast message sent by a base station, a PCI of a target cell in which the terminal device is located includes: performing, by the terminal device, time-frequency synchronization according to the PSS sequence and the SSS sequence that are used to indicate the PCI of the cell in the communications system and the first broadcast message, to determine the PCI of the target cell.

With reference to any one of the first aspect to the third possible implementation of the first aspect, in a fourth possible implementation, 36 PCIs are preconfigured in the terminal device and/or the base station, and the 36 PCIs are indicated by a combination of 3 PSS sequences and 12 SSS sequences.

According to a second aspect, a method for indicating a physical cell identifier PCI is provided, and the method is applied to a communications system. The method includes sending, by a base station, a first broadcast message, where the first broadcast message carries PCI information of a target cell. The method also includes sending a second broadcast message, where the second broadcast message carries extended PCI information of the target cell, and the extended PCI identifies the target cell, or a combination of the extended PCI and a PCI of the target cell identifies the target cell, where the PCI information of the target cell is corresponding to a first scrambling code sequence, and the extended PCI information of the second broadcast message is scrambled by using the first scrambling code sequence.

With reference to the second aspect, in a first possible implementation, when the extended PCI identifies the target cell, the extended PCI information is corresponding to a second scrambling code, and the base station scrambles, according to the second scrambling code, data transmitted in the target cell; or when the combination of the extended PCI and the PCI of the target cell identifies the target cell, a combination of the extended PCI information and the PCI information is corresponding to a second scrambling code, and the base station scrambles, according to the second scrambling code, data transmitted in the target cell.

With reference to the second aspect or the first possible implementation of the second aspect, in a second possible implementation, the extended PCI is a cell identity of a global cell identity; or the extended PCI is a combination of a cell identity of a global cell identity and all bits or some bits of a location area identity of the global cell identity.

With reference to any one of the second aspect to the second possible implementation of the second aspect, in a third possible implementation, the first broadcast message includes a PSS sequence and a secondary synchronization sequence SSS sequence that are used to indicate the PCI of the target cell, where 36 PCIs are preconfigured in the base station, and the 36 PCIs are indicated by a combination of 3 PSS sequences and 12 SSS sequences.

According to a third aspect, a terminal device is provided and includes: a PCI determining unit, configured to determine, according to a first broadcast message sent by a base station, a PCI of a target cell in which the terminal device is located; a first scrambling code determining unit, configured to determine a first scrambling code according to the PCI of the target cell; and an extended PCI determining unit, configured to determine an extended PCI of the target cell according to a second broadcast message sent by the base station and the first scrambling code, where the extended PCI identifies the target cell, or a combination of the extended PCI and the PCI of the target cell identifies the target cell.

With reference to the third aspect, in a first possible implementation, the terminal device further includes: a second scrambling code determining unit, configured to determine a second scrambling code according to the extended PCI when the extended PCI identifies the target cell, where the second scrambling code is used to enable the terminal device to decode data received from the base station; or a second scrambling code determining unit, configured to determine a second scrambling code according to the combination of the extended PCI and the PCI of the target cell when the combination of the extended PCI and the PCI of the target cell identifies the target cell, where the second scrambling code is used to enable the terminal device to decode data received from the base station.

With reference to the third aspect or the first possible implementation of the third aspect, in a second possible implementation, the extended PCI is a cell identity of a global cell identity; or the extended PCI is a combination of a cell identity of a global cell identity and all bits or some bits of a location area identity of the global cell identity.

With reference to any one of the third aspect to the second possible implementation of the third aspect, in a third possible implementation, the first broadcast message includes a PSS sequence and a SSS sequence that are used to indicate the PCI of the target cell; and the PCI determining unit is specifically configured to: perform time-frequency synchronization according to the PSS sequence and the SSS sequence that are used to indicate the PCI of the cell in the communications system and the first broadcast message, to determine the PCI of the target cell.

With reference to any one of the third aspect to the third possible implementation of the third aspect, in a fourth possible implementation, 36 PCIs are preconfigured in the terminal device and/or the base station, and the 36 PCIs are indicated by a combination of 3 PSS sequences and 12 SSS sequences.

According to a fourth aspect, a base station is provided and includes: a first sending unit, configured to send a first broadcast message, where the first broadcast message carries PCI information of a target cell; and a second sending unit, configured to send a second broadcast message, where the second broadcast message carries extended PCI information of the target cell, and the extended PCI identifies the target cell, or a combination of the extended PCI and a PCI of the target cell identifies the target cell, where the PCI information of the target cell is corresponding to a first scrambling code sequence, and the extended PCI information of the second broadcast message is scrambled by using the first scrambling code sequence.

With reference to the fourth aspect, in a first possible implementation, the base station further includes: a scrambling unit, configured for the base station to: when the extended PCI identifies the target cell, scramble, according to a second scrambling code, data transmitted in the target cell, where the extend PCI information is corresponding to the second scrambling code; or a scrambling unit, configured for the base station to: when the combination of the extended PCI and the PCI of the target cell identifies the target cell, scramble, according to a second scrambling code, data transmitted in the target cell, where a combination of the extended PCI information and the PCI information is corresponding to the second scrambling code.

With reference to the fourth aspect or the first possible implementation of the fourth aspect, in a second possible implementation, the extended PCI is a cell identity of a global cell identity; or the extended PCI is a combination of a cell identity of a global cell identity and all bits or some bits of a location area identity of the global cell identity.

With reference to any one of the fourth aspect to the second possible implementation of the fourth aspect, in a third possible implementation, the first broadcast message includes a PSS sequence and a secondary synchronization sequence SSS sequence that are used to indicate the PCI of the target cell, where 36 PCIs are preconfigured in the base station, and the 36 PCIs are indicated by a combination of 3 PSS sequences and 12 SSS sequences.

According to a fifth aspect, a terminal device is provided and includes a memory and a processor, where the memory is configured to store a set of code, and the code is used to control the processor to execute the following actions: determining, according to a first broadcast message sent by a base station, a PCI of a target cell in which the terminal device is located; determining a first scrambling code according to the PCI of the target cell; and determining an extended PCI of the target cell according to a second broadcast message sent by the base station and the first scrambling code, where the extended PCI identifies the target cell, or a combination of the extended PCI and the PCI of the target cell identifies the target cell.

With reference to the fifth aspect, in a first possible implementation, the processor is further configured to: determine a second scrambling code according to the extended PCI when the extended PCI identifies the target cell, where the second scrambling code is used to enable the terminal device to decode data received from the base station; or determine a second scrambling code according to the combination of the extended PCI and the PCI of the target cell when the combination of the extended PCI and the PCI of the target cell identifies the target cell, where the second scrambling code is used to enable the terminal device to decode data received from the base station.

With reference to the fifth aspect or the first possible implementation of the fifth aspect, in a second possible implementation, the extended PCI is a cell identity of a global cell identity; or the extended PCI is a combination of a cell identity of a global cell identity and all bits or some bits of a location area identity of the global cell identity.

With reference to any one of the fifth aspect to the second possible implementation of the fifth aspect, in a third possible implementation, the first broadcast message includes a PSS sequence and a SSS sequence that are used to indicate the PCI of the target cell; and processor is specifically configured to: perform time-frequency synchronization according to the PSS sequence and the SSS sequence that are used to indicate the PCI of the cell in the communications system and the first broadcast message, to determine the PCI of the target cell.

With reference to any one of the fifth aspect to the third possible implementation of the fifth aspect, in a fourth possible implementation, 36 PCIs are preconfigured in the terminal device and/or the base station, and the 36 PCIs are indicated by a combination of 3 PSS sequences and 12 SSS sequences.

According to a sixth aspect, a base station is provided and includes a transmitter, where the transmitter is configured to send a first broadcast message, where the first broadcast message carries PCI information of a target cell; the transmitter is further configured to send a second broadcast message, where the second broadcast message carries extended PCI information of the target cell, and the extended PCI identifies the target cell, or a combination of the extended PCI and a PCI of the target cell identifies the target cell, where the PCI information of the target cell is corresponding to a first scrambling code sequence, and the extended PCI information of the second broadcast message is scrambled by using the first scrambling code sequence.

With reference to the sixth aspect, in a first possible implementation, the base station further includes a memory and a processor, where the memory is configured to store a set of code, and the code is used to control the processor to execute the following actions: when the extended PCI identifies the target cell, generating a second scrambling code according to the extended PCI information, and scrambling, according to the second scrambling code, data transmitted in the target cell; or when the combination of the extended PCI and the PCI of the target cell identifies the target cell, generating a second scrambling code according to a combination of the extended PCI information and the PCI information, and scrambling, according to the second scrambling code, data transmitted in the target cell.

With reference to the sixth aspect or the first possible implementation of the sixth aspect, in a second possible implementation, the extended PCI is a cell identity of a global cell identity; or the extended PCI is a combination of a cell identity of a global cell identity and all bits or some bits of a location area identity of the global cell identity.

With reference to any one of the sixth aspect to the second possible implementation of the sixth aspect, in a third possible implementation, the first broadcast message includes a PSS sequence and a secondary synchronization sequence SSS sequence that are used to indicate the PCI of the target cell, where 36 PCIs are preconfigured in the base station, and the 36 PCIs are indicated by a combination of 3 PSS sequences and 12 SSS sequences.

According to a seventh aspect, a system for indicating a physical cell identifier PCI is provided, and the system includes a terminal device and a base station, where the terminal device is any one of the terminal device according to the third aspect or the fifth aspect, and the base station is any one of the base station according to the fourth aspect or the sixth aspect.

In the method and apparatus for indicating a PCI according to the embodiments of the present invention, a terminal device generates a first scrambling code according to a PCI determined according to a first broadcast message, and then determines an extended PCI of a target cell according to a second broadcast message. The extended PCI or a combination of the extended PCI and the PCI of the target cell is used to identify the target cell, so that when a smaller quantity of PCIs for a cell in an NB M2M system is set, the extended PCI or the combination of the extended PCI and the PCI of the target cell may be used within a specific area to distinguish cells with a same PCI. In this case, the extended PCI or the combination of the extended PCI and the PCI of the target cell may be used for communication between the base station and the terminal device. Even if the terminal device simultaneously receives data sent by the base station to cells with a same PCI, the terminal device can still normally obtain information from the received data.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present embodiments.

The term "and/or" in the embodiments of the present invention describes only an association relationship for describing associated objects and represents that three relationships may exist. For example, A and/or B may represent the following three cases: only A exists, both A and B exist, and only B exists. The term "multiple" in the embodiments of the present invention means two or more.

Embodiment 1

Figure 1:
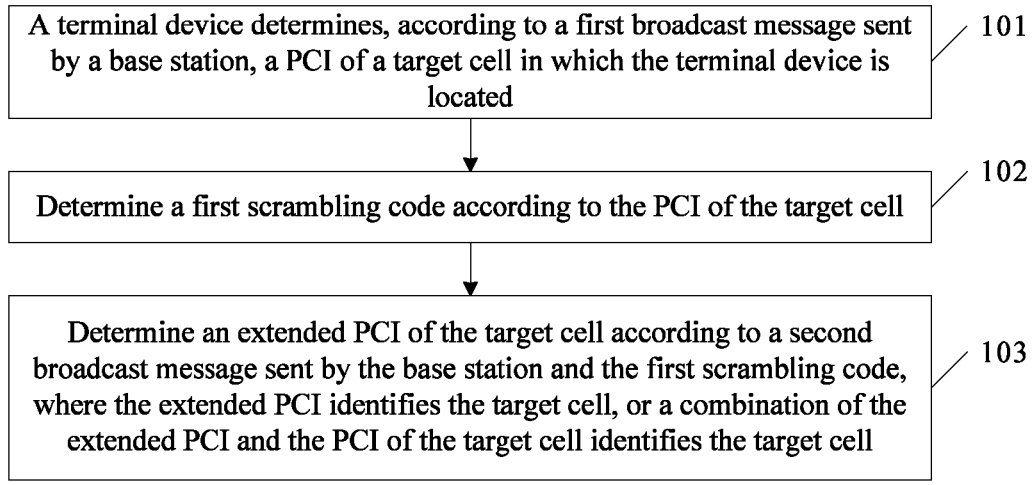
FIG. 1 is a flowchart of a method for indicating a physical cell identifier (PCI) according to an embodiment of the present invention.

An embodiment of the present invention provides a method for indicating a physical cell identifier (PCI), and the method is applied to a communications system. As shown in FIG. 1, the method includes the following steps.

101: A terminal device determines, according to a first broadcast message sent by a base station, a PCI of a target cell in which the terminal device is located.

The method for indicating a PCI according to this embodiment of the present invention may be applied to a Narrow Band Machine-To-Machine (NB M2M) system, or may be applied to another communications system. The terminal device mentioned in this embodiment of the present invention may be a mobile phone, or may be a communications apparatus used in a device such as an electrical power device, a water meter, or a lighting device, and is not limited in this embodiment of the present invention and other embodiments of the present invention.

Optionally, the first broadcast message includes a primary synchronization sequence (PSS) sequence and a secondary synchronization sequence (SSS) sequence that are used to indicate the PCI of the target cell. In this case, step 101 may include: performing, by the terminal device, time-frequency synchronization according to the PSS sequence and the SSS sequence that are used to indicate the PCI of the cell in the communications system and the first broadcast message, to determine the PCI of the target cell.

Specifically, the terminal device may store all PSS sequences and all SSS sequences that are used to indicate PCIs of cells in the communications system. When receiving the first broadcast message, the terminal device correlates the first broadcast message with the PSS sequences stored in the terminal device, to determine a PSS sequence with a highest correlation. Relative positions of a PSS sequence and an SSS sequence are fixed in the first broadcast message, and therefore after detecting the PSS, the terminal device can learn a position at which an SSS sequence may be in the first broadcast message. Then, the terminal device correlates the SSS sequence at the position at which the SSS sequence may be in the broadcast message with the SSS sequences stored in the terminal device, to determine an SSS sequence with a highest correlation; and calculates the PCI of the target cell according to the determined PSS sequence and the SSS sequence.

It should be noted that, in the communications system, bandwidth is generally divided into multiple physical channels, and the physical channels are divided into a broadcast channel, a data channel, a control channel, and the like. The base station sends a broadcast message on the broadcast channel, and the broadcast message may include a system message, a PSS sequence, an SSS sequence, a frame number detection sequence, or the like.

102: Determine a first scrambling code according to the PCI of the target cell.

In a specific implementation of step 102, after obtaining the PCI of the target cell, the terminal device may generate the first scrambling code by using a Gold sequence, and the Gold sequence is obtained by performing shifting and modulo-2 addition on a preferred pair of m-sequences (maximal length linear feedback shift register sequence). An initial value of a first m-sequence is known, and an initial value of a second m-sequence may be set according to an application need. In this embodiment of the present invention, the PCI may be used as all bits or some bits of the initial value of the second m-sequence. This is not limited in this embodiment of the present invention. In this case, the Gold sequence generated by using the first m-sequence and the second m-sequence is the first scrambling code. When the PCI is used as some bits of the initial value of the second m-sequence, the initial value of the second m-sequence may include a terminal identity, a frame number, or the like.

The first scrambling code is a descrambling sequence of the broadcast channel. Specifically, the base station scrambles the system message before sending the broadcast message. The first scrambling code is used as the descrambling sequence to decode the scrambled system message when the terminal device receives the broadcast message sent by the base station.

For example, that the base station scrambles the system message may be specifically: performing modulo-2 addition on the system message and a scrambling sequence. Scrambling and descrambling are inverse operations. When receiving the broadcast message sent by the base station, the terminal device can recover the system message by performing modulo-2 addition on the descrambling sequence and the received scrambled system message, so as to obtain content carried in the system message.

103: Determine an extended PCI of the target cell according to a second broadcast message sent by the base station and the first scrambling code, where the extended PCI identifies the target cell, or a combination of the extended PCI and the PCI of the target cell identifies the target cell.

Specifically, the second broadcast message carries the extended PCI of the target cell.

For example, the extended PCI may be in a system message of the second broadcast message. In this case, in a specific implementation of step 103, the terminal device may parse the second broadcast message according to the first scrambling code, to obtain the extended PCI carried in the system message of the second broadcast message.

It should be noted that, the first broadcast message and the second broadcast message may be a same broadcast message.

Optionally, after step 103, the method may further include: determining, by the terminal device, a second scrambling code according to the extended PCI when the extended PCI identifies the target cell, where the second scrambling code is used to enable the terminal device to decode data received from the base station; or determining, by the terminal device, a second scrambling code according to the combination of the extended PCI and the PCI of the target cell when the combination of the extended PCI and the PCI of the target cell identifies the target cell, where the second scrambling code is used to enable the terminal device to decode data received from the base station.

The second scrambling code is a descrambling sequence of a channel such as a data channel, a control channel, or a random access channel. The data received from the base station by the terminal device may be signaling, control information, scheduling information, downlink data, or the like, sent by the base station through a channel such as the data channel or the control channel.

For a specific implementation of the optional method, reference may be made to the specific implementation of step 102, except that the extended PCI or the combination of the extended PCI and the PCI of the target cell is used as all bits or some bits of the initial value of the second m-sequence. In this case, the Gold sequence generated by using the first m-sequence and the second m-sequence is the second scrambling code. When the extended PCI or the combination of the extended PCI and the PCI of the target cell is used as some bits of the initial value of the second m-sequence, the initial value of the second m-sequence may further include a terminal identity, a frame number, or the like.

In the optional method, when the extended PCI is used to generate the second scrambling code, different extended PCIs may be set for cells with a same PCI, and then different second scrambling codes are generated. When the combination of the extended PCI and the PCI of the target cell is used to generate the second scrambling code, cells with a same PCI may have different combinations of the extended PCI of and the PCI of the target cell, and then different second scrambling codes are generated. No interference is generated when different cells communicate by using the second scrambling code.

Optionally, the extended PCI is a cell identity of a global cell identity; or the extended PCI is a combination of a cell identity of a global cell identity and all bits or some bits of a location area identity of the global cell identity.

Specifically, selection of the some bits in the location area identity may be determined according to an actual requirement. For example, when an identity of two bits is required, an identity of any two bits in the location area identity may be selected.

Optionally, 36 PCIs are preconfigured in the terminal device and/or the base station, and the 36 PCIs are indicated by a combination of 3 PSS sequences and 12 SSS sequences.

In the optional method, because a quantity of PCIs preconfigured in the terminal device and/or the base station is relatively small, the PSS sequences and the SSS sequences that are stored in the terminal device are decreased, and a time-frequency synchronization process is simplified when the terminal device receives the first broadcast message. This may reduce power consumption of the terminal device and reduce costs of the terminal device.

In the method for indicating a PCI according to this embodiment of the present invention, a terminal device generates a first scrambling code according to a PCI determined according to a first broadcast message, and then determines an extended PCI of a target cell according to a second broadcast message. The extended PCI or a combination of the extended PCI and the PCI of the target cell is used to identify the target cell, so that when a smaller quantity of PCIs for a cell in an NB M2M system is set, the extended PCI or the combination of the extended PCI and the PCI of the target cell may be used within a specific area to distinguish cells with a same PCI. In this case, the extended PCI or the combination of the extended PCI and the PCI of the target cell may be used for communication between the base station and the terminal device. Even if the terminal device simultaneously receives data sent by the base station to cells with a same PCI, the terminal device can still normally obtain information from the received data.

Embodiment 2

Figure 2:
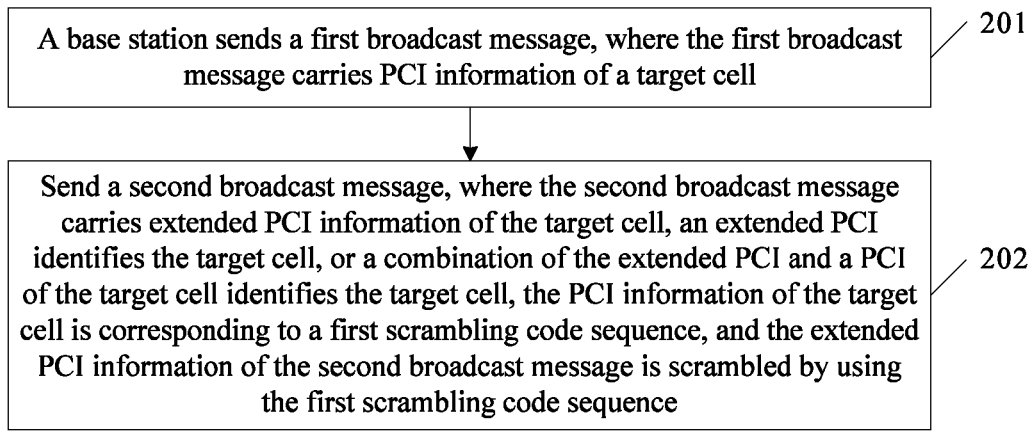
FIG. 2 is a flowchart of another method for indicating a PCI according to an embodiment of the present invention.

An embodiment of the present invention provides a method for indicating a PCI, and the method is applied to a communications system. As shown in FIG. 2, the method includes the following steps.

201: A base station sends a first broadcast message, where the first broadcast message carries PCI information of a target cell.

It should be noted that, for related explanations in this embodiment of the present invention, reference may be made to the related descriptions in Embodiment 1 of the present invention.

Specifically, the PCI information is information that may enable the terminal device to obtain, according to the information, a PCI of a cell (that is, the target cell) in which the terminal device is located. The PCI information may be specifically a PSS sequence and an SSS sequence that indicate the PCI of the target cell.

It should be noted that, in the communications system, bandwidth is generally divided into multiple physical channels, and the physical channels are divided into a broadcast channel, a data channel, a control channel, and the like. The base station sends a broadcast message on the broadcast channel, and the broadcast message may include a system message, a PSS sequence, an SSS sequence, a frame number detection sequence, or the like.

202: Send a second broadcast message, where the second broadcast message carries extended PCI information of the target cell, and the extended PCI identifies the target cell, or a combination of the extended PCI and a PCI of the target cell identifies the target cell.

The PCI information of the target cell is corresponding to a first scrambling code sequence, and the extended PCI information of the second broadcast message is scrambled by using the first scrambling code sequence.

For example, the extended PCI information may be in a system message of the second broadcast message, and the extended PCI information is information that may enable the terminal device to obtain the extended PCI of the target cell according to the information.

Specifically, the terminal device may generate a first scrambling code by using the PCI information of the target cell. The first scrambling code is a descrambling sequence of the broadcast channel, and the first scrambling code may be used to parse the broadcast message sent by the base station to obtain the information carried in the broadcast message.

It should be noted that step 201 and step 202 are performed in a random order. For example, step 201 may be performed before step 202; or step 202 may be performed before step 201; or step 201 and step 202 may be performed simultaneously.

It should be noted that, the first broadcast message and the second broadcast message may be a same broadcast message.

Optionally, when the extended PCI identifies the target cell, the extended PCI information is corresponding to a second scrambling code, and the base station scrambles, according to the second scrambling code, data transmitted in the target cell. When the combination of the extended PCI and the PCI of the target cell identifies the target cell, a combination of the extended PCI information and the PCI information is corresponding to a second scrambling code, and the base station scrambles, according to the second scrambling code, data transmitted in the target cell.

Specifically, the terminal device may generate the second scrambling code by using the extended PCI information or the combination of the extended PCI information and the PCI information of the target cell, where the second scrambling code is a descrambling sequence of a channel such as a data channel, a control channel, a random access channel, or the like. The second scrambling code may be used to parse data sent by the base station through a channel such as the data channel, the control channel, or the random access channel, to obtain information from the data.

Optionally, the extended PCI is a cell identity of a global cell identity; or the extended PCI is a combination of a cell identity of a global cell identity and all bits or some bits of a location area identity of the global cell identity.

Specifically, selection of the some bits in the location area identity may be determined according to an actual requirement. For example, when an identity of two bits is required, an identity of any two bits in the location area identity may be selected.

Optionally, the first broadcast message includes a PSS sequence and an SSS sequence that are used to indicate the PCI of the target cell. 36 PCIs are preconfigured in the base station, and the 36 PCIs are indicated by a combination of 3 PSS sequences and 12 SSS sequences.

In the optional method, because a quantity of PCIs preconfigured in the terminal device and/or the base station is relatively small, the PSS sequences and the SSS sequences that are stored in the terminal device are decreased, and a time-frequency synchronization process is simplified when the terminal device receives the first broadcast message. This may reduce power consumption of the terminal device and reduce costs of the terminal device.

In the method for indicating a PCI according to this embodiment of the present invention, a base station sends a first broadcast message and a second broadcast message to a terminal device, and the terminal device determines a PCI and an extended PCI of a target cell according to the first broadcast message and the second broadcast message. The extended PCI or a combination of the extended PCI and the PCI of the target cell is used to identify the target cell, so that when a smaller quantity of PCIs for a cell in an NB M2M system is set, the extended PCI or the combination of the extended PCI and the PCI of the target cell may be used within a specific area to distinguish cells with a same PCI. In this case, the extended PCI or the combination of the extended PCI and the PCI of the target cell may be used for communication between the base station and the terminal device. Even if the terminal device simultaneously receives data sent by the base station to cells with a same PCI, the terminal device can still normally obtain information from the received data.

Embodiment 3

Figure 3:
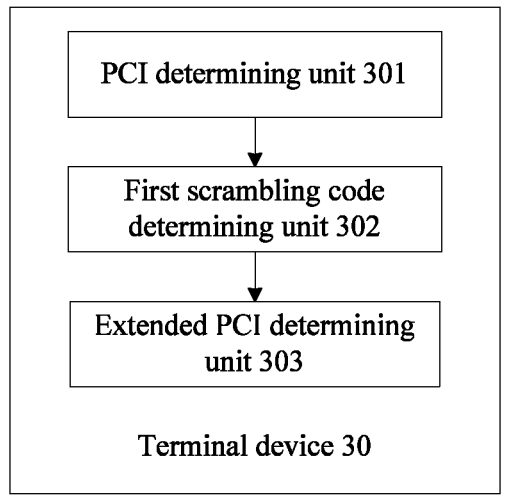
FIG. 3 is a schematic structural diagram of a terminal device according to an embodiment of the present invention.

As shown in FIG. 3, an embodiment of the present invention provides a terminal device 30, and the terminal device 30 is configured to implement the method for indicating a PCI shown in FIG. 1. The terminal device 30 includes: a PCI determining unit 301, configured to determine, according to a first broadcast message sent by a base station, a PCI of a target cell in which the terminal device is located; a first scrambling code determining unit 302, configured to determine a first scrambling code according to the PCI of the target cell; and an extended PCI determining unit 303, configured to determine an extended PCI of the target cell according to a second broadcast message sent by the base station and the first scrambling code, where the extended PCI identifies the target cell, or a combination of the extended PCI and the PCI of the target cell identifies the target cell.

Figure 4:
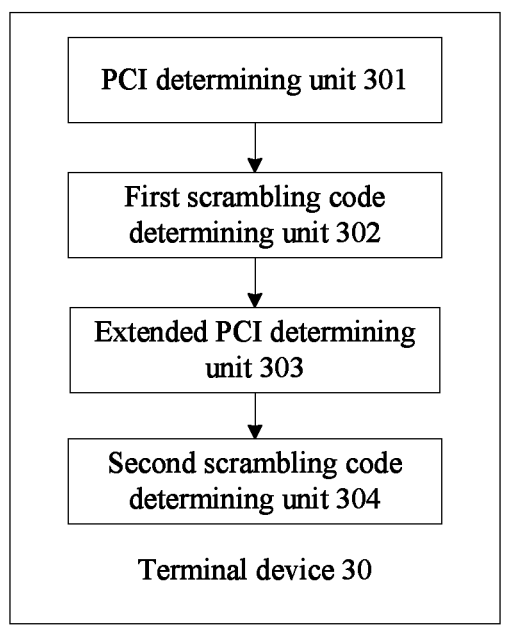
FIG. 4 is a schematic structural diagram of another terminal device according to an embodiment of the present invention.

Optionally, as shown in FIG. 4, the terminal device further includes: a second scrambling code determining unit 304, configured to determine a second scrambling code according to the extended PCI when the extended PCI identifies the target cell, where the second scrambling code is used to enable the terminal device to decode data received from the base station; or a second scrambling code determining unit 304, configured to determine a second scrambling code according to the combination of the extended PCI and the PCI of the target cell when the combination of the extended PCI and the PCI of the target cell identifies the target cell, where the second scrambling code is used to enable the terminal device to decode data received from the base station.

Optionally, the extended PCI is a cell identity of a global cell identity; or the extended PCI is a combination of a cell identity of a global cell identity and all bits or some bits of a location area identity of the global cell identity.

Optionally, the first broadcast message includes a primary synchronization signal (PSS) sequence and a secondary synchronization signal (SSS) sequence that are used to indicate the PCI of the target cell. The PCI determining unit 301 is specifically configured to: perform time-frequency synchronization according to the PSS sequence and the SSS sequence that are used to indicate the PCI of the cell in the communications system and the first broadcast message, to determine the PCI of the target cell.

Optionally, 36 PCIs are preconfigured in the terminal device and/or the base station, and the 36 PCIs are indicated by a combination of 3 PSS sequences and 12 SSS sequences.

The terminal device according to this embodiment of the present invention generates a first scrambling code according to a PCI determined according to a first broadcast message, and then determines an extended PCI of a target cell according to a second broadcast message. The extended PCI or a combination of the extended PCI and the PCI of the target cell is used to identify the target cell, so that when a smaller quantity of PCIs for a cell in an NB M2M system is set, the extended PCI or the combination of the extended PCI and the PCI of the target cell may be used within a specific area to distinguish cells with a same PCI. In this case, the extended PCI or the combination of the extended PCI and the PCI of the target cell may be used for communication between the base station and the terminal device. Even if the terminal device simultaneously receives data sent by the base station to cells with a same PCI, the terminal device can still normally obtain information from the received data.

Embodiment 4

In a hardware implementation, all the modules in Embodiment 3 may be, in a hardware form, embedded in or be independent of a processor of a terminal device, or may be stored in a software form in a memory of the terminal device, so that the processor calls the foregoing modules to perform the operations corresponding to the foregoing modules. The processor may be a central processing unit (CPU), a microprocessor, a single-chip microcomputer, or the like.

Figure 5:
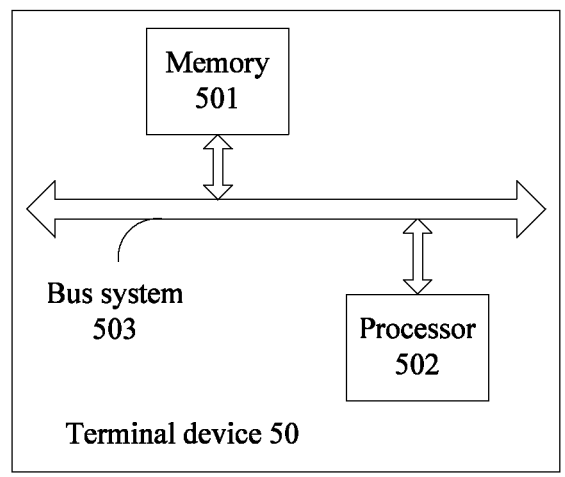
FIG. 5 is a schematic structural diagram of still another terminal device according to an embodiment of the present invention.

As shown in FIG. 5, an embodiment of the present invention provides a terminal device 50, and the terminal device 50 is configured to implement the method for indicating a PCI shown in FIG. 1. The terminal device 50 includes a memory 501, a processor 502, and a bus system 503.

The memory 501 and the processor 502 are coupled by using the bus system 503. The memory 501 may contain a random access memory, or may include a non-volatile memory (non-volatile memory), such as at least one disk memory. The bus system 503 may be divided into an address bus, a data bus, a control bus, or the like. For ease of representation, the bus is represented by using only one bold line in FIG. 5, which, however, does not mean that there is only one bus or one type of bus.

The memory 501 is configured to store a set of code, and the code is used to control the processor 502 to execute the following actions: determining, according to a first broadcast message sent by a base station, a PCI of a target cell in which the terminal device is located; determining a first scrambling code according to the PCI of the target cell; and determining an extended PCI of the target cell according to a second broadcast message sent by the base station and the first scrambling code, where the extended PCI identifies the target cell, or a combination of the extended PCI and the PCI of the target cell identifies the target cell.

Optionally, the processor 502 is further configured to: determine a second scrambling code according to the extended PCI when the extended PCI identifies the target cell, where the second scrambling code is used to enable the terminal device to decode data received from the base station; or determine a second scrambling code according to the combination of the extended PCI and the PCI of the target cell when the combination of the extended PCI and the PCI of the target cell identifies the target cell, where the second scrambling code is used to enable the terminal device to decode data received from the base station.

Optionally, the extended PCI is a cell identity of a global cell identity; or the extended PCI is a combination of a cell identity of a global cell identity and all bits or some bits of a location area identity of the global cell identity.

Optionally, the first broadcast message includes a PSS sequence and a SSS sequence that are used to indicate the PCI of the target cell. The processor 502 is specifically configured to: perform time-frequency synchronization according to the PSS sequence and the SSS sequence that are used to indicate the PCI of the cell in the communications system and the first broadcast message, to determine the PCI of the target cell.

Optionally, 36 PCIs are preconfigured in the terminal device and/or the base station, and the 36 PCIs are indicated by a combination of 3 PSS sequences and 12 SSS sequences.

The terminal device according to this embodiment of the present invention generates a first scrambling code according to a PCI determined according to a first broadcast message, and then determines an extended PCI of a target cell according to a second broadcast message. The extended PCI or a combination of the extended PCI and the PCI of the target cell is used to identify the target cell, so that when a smaller quantity of PCIs for a cell in an NB M2M system is set, the extended PCI or the combination of the extended PCI and the PCI of the target cell may be used within a specific area to distinguish cells with a same PCI. In this case, the extended PCI or the combination of the extended PCI and the PCI of the target cell may be used for communication between the base station and the terminal device. Even if the terminal device simultaneously receives data sent by the base station to cells with a same PCI, the terminal device can still normally obtain information from the received data.

Embodiment 5

Figure 6:
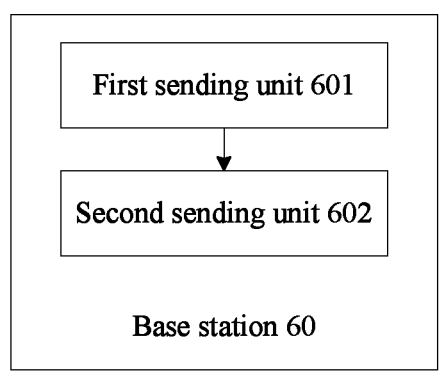
FIG. 6 is a schematic structural diagram of a base station according to an embodiment of the present invention.

As shown in FIG. 6, an embodiment of the present invention provides a base station 60, and the base station 60 is configured to implement the method for indicating a PCI shown in FIG. 2. The base station 60 includes: a first sending unit 601, configured to send a first broadcast message, where the first broadcast message carries PCI information of a target cell; and a second sending unit 602, configured to send a second broadcast message, where the second broadcast message carries extended PCI information of the target cell, the extended PCI identifies the target cell, or a combination of the extended PCI and a PCI of the target cell identifies the target cell, the PCI information of the target cell is corresponding to a first scrambling code sequence, and the extended PCI information of the second broadcast message is scrambled by using the first scrambling code sequence.

Figure 7:
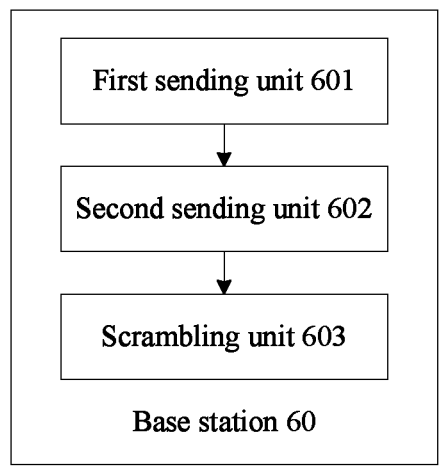
FIG. 7 is a schematic structural diagram of another base station according to an embodiment of the present invention.

Optionally, as shown in FIG. 7, the base station 60 further includes: a scrambling unit 603, configured for the base station 60 to: when the extended PCI identifies the target cell, scramble, according to a second scrambling code, data transmitted in the target cell, where the extend PCI information is corresponding to the second scrambling code; or a scrambling unit 603, configured for the base station 60 to: when the combination of the extended PCI and the PCI of the target cell identifies the target cell, scramble, according to a second scrambling code, data transmitted in the target cell, where a combination of the extended PCI information and the PCI information is corresponding to the second scrambling code.

Optionally, the extended PCI is a cell identity of a global cell identity; or the extended PCI is a combination of a cell identity of a global cell identity and all bits or some bits of a location area identity of the global cell identity.

Optionally, the first broadcast message includes a PSS sequence and a secondary synchronization sequence SSS sequence that are used to indicate the PCI of the target cell. 36 PCIs are preconfigured in the base station 60, and the 36 PCIs are indicated by a combination of 3 PSS sequences and 12 SSS sequences.

The base station according to this embodiment of the present invention sends a first broadcast message and a second broadcast message to a terminal device, and the terminal device determines a PCI of a target cell and an extended PCI according to the first broadcast message and the second broadcast message. The extended PCI or a combination of the extended PCI and the PCI of the target cell is used to identify the target cell, so that when a smaller quantity of PCIs for a cell in an NB M2M system is set, the extended PCI or the combination of the extended PCI and the PCI of the target cell may be used within a specific area to distinguish cells with a same PCI. In this case, the extended PCI or the combination of the extended PCI and the PCI of the target cell may be used for communication between the base station and the terminal device. Even if the terminal device simultaneously receives data sent by the base station to cells with a same PCI, the terminal device can still normally obtain information from the received data.

Embodiment 6

In a hardware implementation, all the modules in Embodiment 5 may be, in a hardware form, embedded in or independent of a processor of a base station, or may be stored in a software form in a memory of the terminal device, so that the processor performs, by means of calling, the operations corresponding to the foregoing modules. The processor may be a central processing unit (CPU), a microprocessor, a single-chip microcomputer, or the like.

Figure 8:
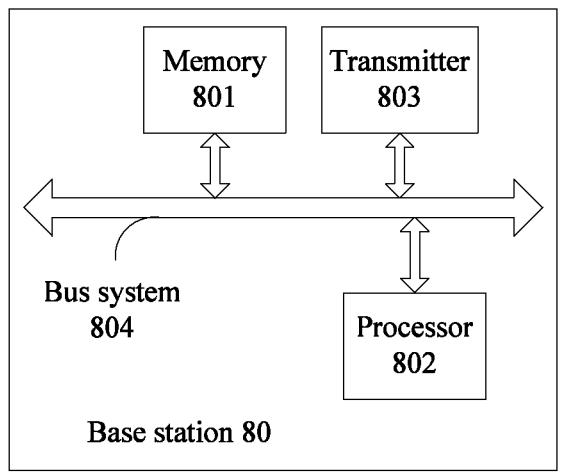
FIG. 8 is a schematic structural diagram of still another base station according to an embodiment of the present invention.

As shown in FIG. 8, an embodiment of the present invention provides a base station 80, and the base station 80 is configured to implement the method for indicating a PCI shown in FIG. 2. The base station 80 includes a memory 801, a processor 802, a transmitter 803, and a bus system 804.

The memory 801, the processor 802, and the transmitter 803 are coupled by using the bus system 804. The memory 801 may contain a random access memory, or may include a non-volatile memory (non-volatile memory), such as at least one disk memory. The bus system 804 may be divided into an address bus, a data bus, a control bus, or the like. For ease of representation, the bus is represented by using only one bold line in FIG. 8, which, however, does not mean that there is only one bus or one type of bus.

The memory 801 is configured to store a set of codes, and the code is used to control the processor 802 to execute the following actions: determining a first broadcast message and a second broadcast message.

The transmitter 803 is configured to send the first broadcast message, where the first broadcast message carries PCI information of a target cell.

The transmitter 803 is further configured to send a second broadcast message, where the second broadcast message carries extended PCI information of the target cell, and the extended PCI identifies the target cell, or a combination of the extended PCI and a PCI of the target cell identifies the target cell.

The PCI information of the target cell is corresponding to a first scrambling code sequence, and the extended PCI information of the second broadcast message is scrambled by using the first scrambling code sequence.

Optionally, the processor 802 is further configured for the base station to: when the extended PCI identifies the target cell, scramble, according to a second scrambling code, data transmitted in the target cell, where the extend PCI information is corresponding to the second scrambling code; or when the combination of the extended PCI and the PCI of the target cell identifies the target cell, scramble, according to a second scrambling code, data transmitted in the target cell, where a combination of the extended PCI information and the PCI information is corresponding to the second scrambling code.

Optionally, the extended PCI is a cell identity of a global cell identity; or the extended PCI is a combination of a cell identity of a global cell identity and all bits or some bits of a location area identity of the global cell identity.

Optionally, the first broadcast message includes a PSS sequence and a secondary synchronization sequence SSS sequence that are used to indicate the PCI of the target cell. 36 PCIs are preconfigured in the base station, and the 36 PCIs are indicated by a combination of 3 PSS sequences and 12 SSS sequences.

The base station according to this embodiment of the present invention sends a first broadcast message and a second broadcast message to a terminal device, and the terminal device determines a PCI of a target cell and an extended PCI according to the first broadcast message and the second broadcast message. The extended PCI or a combination of the extended PCI and the PCI of the target cell is used to identify the target cell, so that when a smaller quantity of PCIs for a cell in an NB M2M system is set, the extended PCI or the combination of the extended PCI and the PCI of the target cell may be used within a specific area to distinguish cells with a same PCI. In this case, the extended PCI or the combination of the extended PCI and the PCI of the target cell may be used for communication between the base station and the terminal device. Even if the terminal device simultaneously receives data sent by the base station to cells with a same PCI, the terminal device can still normally obtain information from the received data.

An embodiment of the present invention provides a system for indicating a PCI. The system includes a terminal device and a base station, where the terminal device may be either of the terminal devices provided in Embodiment 3 or Embodiment 4, and the base station may be either of the base stations provided in Embodiment 5 or Embodiment 6.

In the several embodiments provided in the present application, it should be understood that the disclosed apparatus and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed.

The modules described as separate parts may or may not be physically separate, and parts displayed as modules may or may not be physical modules, may be located in one position, or may be distributed on a plurality of network units. A part or all of the units may be selected according to actual needs to achieve the objectives of the solutions of the embodiments.

In addition, functional modules in the embodiments of the present invention may be integrated into one processing module, or two or more modules are integrated into one module. The integrated module may be implemented in a form of hardware, or may be implemented in a form of hardware in addition to a software functional module.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a universal serial bus (USB) flash drive, a removable hard disk, a read-only memory (ROM for short), a random access memory (RAM for short), a magnetic disk, or an optical disc.

Finally, it should be noted that the foregoing embodiments are merely intended for describing the technical solutions of the present embodiments, but not for limiting the present embodiments. Although the present embodiments are described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method comprising:
    determining, by a terminal device, according to a first broadcast message sent by a base station, a physical cell identifier (PCI) of a target cell in which the terminal device is located;
    determining, by the terminal device, a first scrambling code according to a preferred pair of maximal length linear feedback shift register sequences (m-sequences), wherein a first m-sequence of the pair of m-sequences is predetermined, and wherein a second m-sequence of the pair of m-sequences comprises the PCI of the target cell;
    determining, by the terminal device, an extended PCI of the target cell according to a second broadcast message sent by the base station and the first scrambling code, wherein the extended PCI identifies the target cell alone or in combination with the PCI of the target cell; and
    receiving, by the terminal device, data sent from the base station, and descrambling the data according to a second scrambling code determined from the preferred pair of m-sequences and according to the extended PCI.

2. The method according to claim 1, wherein the method further comprises:
    determining, by the terminal device, the second scrambling code according to a combination of the extended PCI and according the PCI of the target cell, after determining the extended PCI of the target cell, in response to the combination of the extended PCI and the PCI of the target cell identifying the target cell.

3. The method according to claim 1, wherein the extended PCI is a cell identity of a global cell identity alone or in combination with some or all bits of a location area identity of the global cell identity.

4. The method according to claim 1, wherein the first broadcast message comprises a primary synchronization signal (PSS) sequence and a secondary synchronization signal (SSS) sequence that indicate the PCI of the target cell; and
    wherein determining the PCI of the target cell in which the terminal device is located comprises performing, by the terminal device, time-frequency synchronization according to the PSS sequence and according to the SSS sequence, to determine the PCI of the target cell.

5. The method according to claim 1, wherein 36 PCIs are preconfigured in the terminal device or in the base station, wherein the 36 PCIs are indicated by a combination of 3 PSS sequences and 12 SSS sequences.

6. A method comprising:
    sending, by a base station, a first broadcast message, wherein the first broadcast message carries a physical cell identifier (PCI) information of a target cell and is scrambled according to a first scrambling code generated according to a preferred pair of maximal length linear feedback shift register sequences (m-sequences), wherein a first m-sequence of the pair of m-sequences is predetermined, and wherein a second m-sequence of the pair of m-sequences comprises the PCI of the target cell;
    sending, by the base station, a second broadcast message, wherein the second broadcast message carries an extended PCI of the target cell, and wherein the extended PCI identifies the target cell alone or in combination with a PCI of the target cell identifies the target cell, wherein the PCI of the target cell corresponds to a first scrambling code sequence, and wherein the extended PCI of the second broadcast message is scrambled using the first scrambling code sequence; and
    sending, by the base station, to a terminal device, data scrambled to a second scrambling code determined from the preferred pair of m-sequences according to the extended PCI.

7. The method according to claim 6:
    wherein the extended PCI corresponds to the second scrambling code, in response to the extended PCI identifying the target cell; and
    wherein a combination of the extended PCI and the PCI corresponds to the second scrambling code, in response to the combination of the extended PCI and the PCI of the target cell identifying the target cell.

8. The method according to claim 6, wherein the extended PCI is a cell identity of a global cell identity alone or in combination with some or all bits of a location area identity of the global cell identity.

9. The method according to claim 6:
    wherein the first broadcast message comprises a primary synchronization signal (PSS) sequence and a secondary synchronization sequence (SSS) sequence indicating the PCI of the target cell; and
    wherein 36 PCIs are preconfigured in the base station, and wherein the 36 PCIs are indicated by a combination of 3 PSS sequences and 12 SSS sequences.

10. A terminal device, comprising:
    a processor; and
    a non-transitory computer readable storage medium storing a program for execution by the processor, the program including instructions to:
        determine, according to a first broadcast message sent by a base station, a physical cell identifier (PCI) of a target cell in which the terminal device is located;
        determine a first scrambling code according to a preferred pair of maximal length linear feedback shift register sequences (m-sequences), wherein a first m-sequence of the pair of m-sequences is predetermined, and wherein a second m-sequence of the pair of m-sequences comprises the PCI of the target cell; and
        determine an extended PCI of the target cell according to a second broadcast message sent by the base station and according to the first scrambling code, wherein the extended PCI identifies the target cell alone or in combination with the PCI of the target cell identifies the target cell; and
        receive, by the terminal device, data sent from the base station, and descramble the data according to a second scrambling code determined from the preferred pair of m-sequences and according to the extended PCI.

11. The terminal device according to claim 10, wherein the instructions further comprise instructions to:
    determine the second scrambling code according to the combination of the extended PCI and the PCI of the target cell, in response to the combination of the extended PCI and the PCI of the target cell identifying the target cell.

12. The terminal device according to claim 10, wherein the extended PCI is a cell identity of a global cell identity alone or in combination with a global cell identity and some or all bits of a location area identity of the global cell identity.

13. The terminal device according to claim 10, wherein the first broadcast message comprises a primary synchronization signal (PSS) sequence and a secondary synchronization signal (SSS) sequence that indicate the PCI of the target cell; and wherein the instructions further comprise instructions to perform time-frequency synchronization according to the PSS sequence and according to the SSS sequence, to determine the PCI of the target cell.

14. The terminal device according to claim 10, wherein 36 PCIs are preconfigured in the terminal device or in the base station, and wherein the 36 PCIs are indicated by a combination of 3 PSS sequences and 12 SSS sequences.

15. A base station, comprising:
a processor; and
a non-transitory computer readable storage medium storing a program for execution by the processor, the program including instructions to:
send a first broadcast message, wherein the first broadcast message carries physical cell identifier (PCI) information of a target cell and is scrambled according to a first scrambling code generated according to a preferred pair of maximal length linear feedback shift register sequences (m-sequences), wherein a first m-sequence of the pair of m-sequences is predetermined, and wherein a second m-sequence of the pair of m-sequences comprises the PCI of the target cell; and
send a second broadcast message, wherein the second broadcast message carries an extended PCI of the target cell, and wherein the extended PCI identifies the target cell alone or in combination with a PCI of the target cell identifies the target cell, wherein the PCI of the target cell corresponds to a first scrambling code sequence, and wherein the extended PCI of the second broadcast message is scrambled using the first scrambling code sequence; and
send, to a terminal device, data scrambled to a second scrambling code determined from the preferred pair of m-sequences according to the extended PCI.

16. The base station according to claim 15, wherein the instructions further comprise instructions to:
wherein the extended PCI corresponds to the second scrambling code, in response to the extended PCI identifying the target cell; and
wherein a combination of the extended PCI and the PCI corresponds to the second scrambling code, in response to the combination of the extended PCI and the PCI of the target cell identifying the target cell.

17. The base station according to claim 15, wherein the extended PCI is a cell identity of a global cell identity alone or in combination with some or all bits of a location area identity of the global cell identity.

18. The base station according to claim 15:
wherein the first broadcast message comprises a primary synchronization signal (PSS) sequence and a secondary synchronization sequence (SSS) sequence that indicate the PCI of the target cell; and
wherein 36 PCIs are preconfigured in the base station, and wherein the 36 PCIs are indicated by a combination of 3 PSS sequences and 12 SSS sequences.

* * * * *